(12) United States Patent
Ignatoff

(10) Patent No.: US 9,082,218 B2
(45) Date of Patent: Jul. 14, 2015

(54) METHOD FOR MANIPULATING THREE-DIMENSIONAL VOXEL DATA FOR ON-SCREEN VISUAL

(75) Inventor: Daniel Jonathan Ignatoff, Hayward, CA (US)

(73) Assignee: Roblox Corporation, San Mateo, CA (US)

( * ) Notice: Subject to any disclaimer, the term of this patent is extended or adjusted under 35 U.S.C. 154(b) by 591 days.

(21) Appl. No.: 13/428,321

(22) Filed: Mar. 23, 2012

(65) Prior Publication Data

US 2013/0249914 A1    Sep. 26, 2013

(51) Int. Cl.
*G06T 15/08* (2011.01)
*G06T 19/00* (2011.01)

(52) U.S. Cl.
CPC ............... *G06T 15/08* (2013.01); *G06T 19/00* (2013.01)

(58) Field of Classification Search
None
See application file for complete search history.

(56) References Cited

U.S. PATENT DOCUMENTS

| | | | |
|---|---|---|---|
| 5,559,901 A * | 9/1996 | Lobregt | 382/256 |
| 5,898,793 A * | 4/1999 | Karron et al. | 382/131 |
| 6,542,153 B1 * | 4/2003 | Liu et al. | 345/424 |
| 6,573,892 B1 * | 6/2003 | Yang et al. | 345/421 |
| 2003/0025650 A1 * | 2/2003 | Uesaki et al. | 345/6 |
| 2006/0290695 A1 * | 12/2006 | Salomie | 345/420 |
| 2011/0191767 A1 * | 8/2011 | Pinsky et al. | 717/176 |

OTHER PUBLICATIONS

Yongjie Zhang, Chandrajit Bajaj, "Adaptive and quality quadrilateral/hexahedral meshing from volumetric data", Comput. Methds Appl. Mech. Engrg. 195 (2006) 942-960.*

Dan Ruan, et al. "Nonrigid Registration Using Regularization that Accommodates Local Tissue Rigidity", Medical Imaging, Proc. of SPIE, vol. 6144, 614412 (2006).*

* cited by examiner

*Primary Examiner* — Devona Faulk
*Assistant Examiner* — William Beutel
(74) *Attorney, Agent, or Firm* — Donald R. Boys; Central Coast Patent Agency, Inc.

(57) ABSTRACT

A method for modifying an onscreen rendering of three-dimensional data stored in a voxel cell of a voxel grid to produce an altered visual effect for the cell comprising the steps (a) for each vertex of the voxel cell, determining the data density ratio in neighboring voxel cells, or determining the material type of the voxel cell and or neighboring voxel cells, (b) for each vertex in the voxel cell, and based on the results of (a), determining to change the spatial position of the vertex, and (c) for each vertex in the voxel cell, and based on the decision in (b), generating three vertex location offset coordinates defining a new vertex location.

14 Claims, 3 Drawing Sheets

Smooth

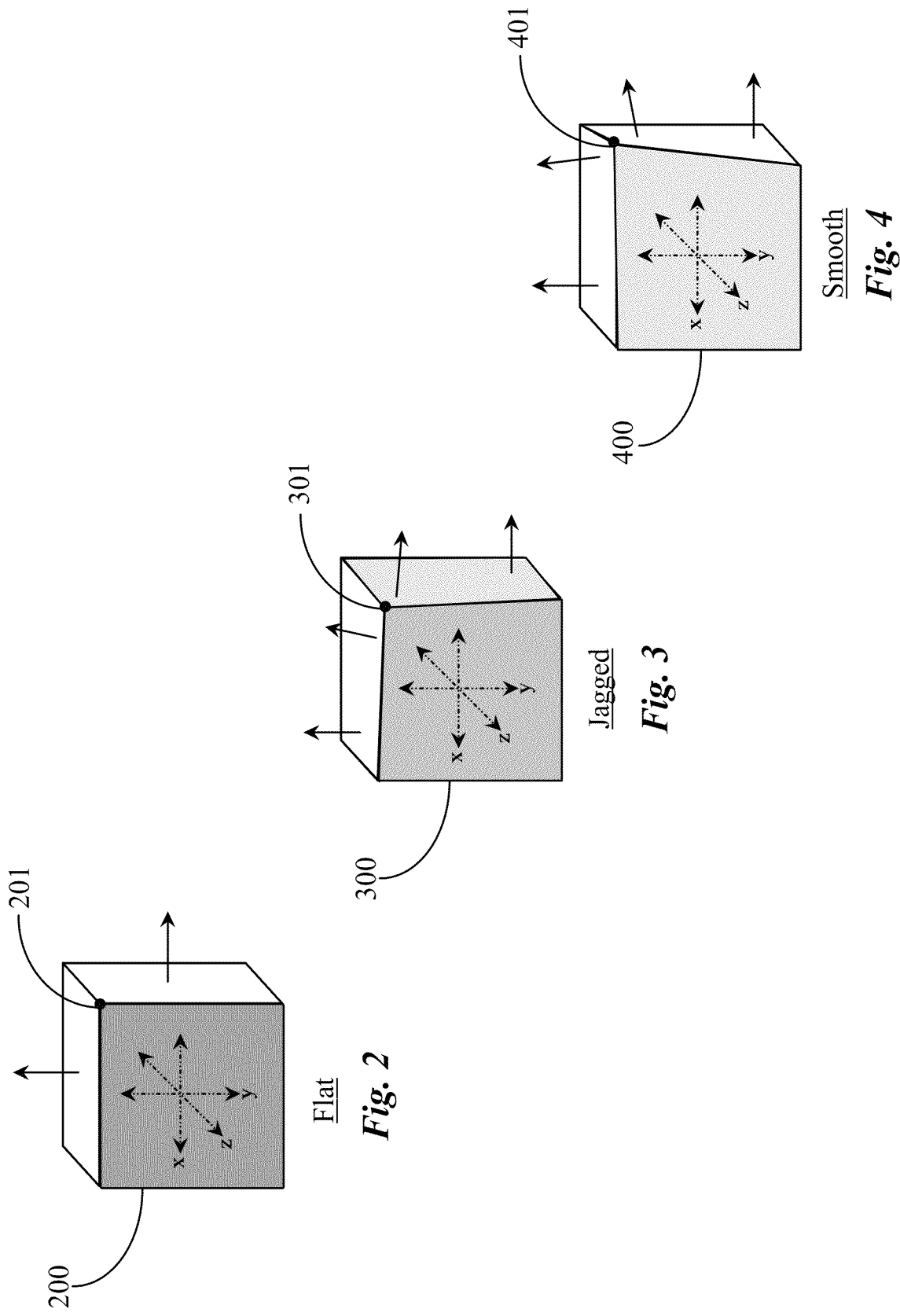

METHOD FOR MANIPULATING THREE-DIMENSIONAL VOXEL DATA FOR ON-SCREEN VISUAL

BACKGROUND OF THE INVENTION

1. Field of the Invention

The present invention is in the field of object modeling and rendering, and pertains more particularly to methods and apparatus for simulating altered appearances of three-dimensional objects rendered on a display screen.

2. Discussion of the State of the Art

In the field of object modeling and rendering, new tools used to enable building and rendering of three-dimensional objects for rendering in three-dimensional space are continually contemplated. Often data used to describe a three dimensional object is stored in a voxel cell on a voxel grid. A voxel grid is a regular n-dimensional grid that represents portions of virtual space. A voxel grid is an efficient and convenient representation for various virtual game and virtual world applications. Three important aspects of voxel representation in object modeling are the regular grid of voxel data in random access memory (RAM), the rendered on-screen geometry, and the physical geometry leveraged for physics simulation purposes.

Data in a voxel cell is typically linear and describes the three-dimensional layout of the portion of the object or three-dimensional feature being represented by that cell. In this respect a voxel is a three-dimensional pixel. In object or scene rendering, important pieces of data are vertex locations and the normal vectors, termed "normals" in the art, that are associated with those vertices. Direction of the normal vectors is used in simulating lighting and shadowing, for example.

One aspect of voxel representation of three-dimensional objects is that while voxel representation is very efficient in terms of memory processing, the resulting graphics layout is often unblended with abrupt or blocky edges. While tools exist to simulate smoothing of blocky edges and the like for blocks or cubes used to create features in a virtual environment or space, these tools are not robust, and many times are manually operated, creating more task performance requirements for the operator.

Therefore, what is clearly needed are methods for automatic and dynamic altering of rendered on-screen, three-dimensional graphics that are more robust than current methods and that do not significantly increase task performance for the user.

SUMMARY OF THE INVENTION

The problem stated above is that visual enhancement is desirable in rendering a three dimensional objects in virtual space, but many of the conventional means for creating visual enhancement for rendered objects, such as graphics visual editing tools, also create more manual tasking. The inventors therefore considered functional components of a three-dimensional object rendering system, looking for elements that exhibit potential for interoperability that could potentially be harnessed to provide methods for enhancing visual aspects of three-dimensional objects rendered, but in a manner that would not create manual tasking on the part of a user.

Every three-dimensional graphics rendering system is characterized by software object creation and rendering tools, one by-product of which is significant task requirements for object representation in the virtual environment. Most such three-dimensional object rendering systems employ servers and software to enable creation and rendering of virtual objects and terrain for application to virtual environments, and game severs running software are typically a part of such apparatus.

The present inventors realized in an intuitive moment that if, at the point of rendering, three-dimensional graphics could be automatically enhanced for visual aesthetics, significant reduction in manual processing requirements might result. The inventor therefore conceived a unique method for automatic modification of onscreen geometric profiles of three-dimensional objects that allowed users to create terrain and certain other three dimensional objects and have those objects automatically enhanced during visual representation onscreen. A significant improvement in the graphics feel of the environment results, with no impediment to efficiency in task performance created.

Accordingly, in aspects of the present invention, a method is provided for modifying an onscreen rendering of three-dimensional data stored in a voxel cell of a voxel grid to produce an altered visual effect for the cell. The method includes the steps (a) for each vertex of the voxel cell, determining the data density ratio in neighboring voxel cells, or determining the material type of the voxel cell and or neighboring voxel cells, (b) for each vertex in the voxel cell, and based on the results of (a), determining to change the spatial position of the vertex, and (c) for each vertex in the voxel cell, and based on the decision in (b), generating three vertex location offset coordinates defining a new vertex location.

In one aspect of the method, the physics simulation profiles of the data in each voxel cell are modified according to the onscreen results. In one aspect, the altered visual effect is a smoothing transformation. In another aspect, the altered visual effect is a jagged randomization. In one aspect, the altered visual effect is a hybrid between smoothing and randomization.

In one aspect of the method for a smoothing transformation, wherein in step (c), a linear constraint is applied relative to the new computed position of a vertex, the constraint linearly proportional to the ratio of data density of the neighboring cells. In one aspect for a randomized transformation, wherein in step (a), the material type of the voxel cell is determined instead of data density. In one aspect for a smoothing transformation, the method further includes a step for readjusting certain vertices to better conform to resulting shadow contours resulting from a normal smoothing operation.

In a preferred embodiment, the method is performed in a layer above the original data representation in memory relative to the unmodified voxel grid. Also in a preferred embodiment, a further step is performed to compute new normals for the new vertex positions. In one embodiment, in step (c), a pseudorandom number generator is used to generate the offset coordinates. In a preferred embodiment, the logical coordinates of each vertex are used as input to the pseudorandom number generator so randomly perturbed vertexes are consistent with offset coordinates. In one aspect where materials are considered for certain effects, the method further includes use of a hierarchy of specific algorithms for treating different material types that may abut one another when rendered onscreen in a virtual environment.

According to an embodiment of the present invention, a system for modifying an onscreen rendering of three-dimensional data stored in a voxel cell of a voxel grid to produce an altered visual effect for the cell comprising an Internet-connected server, and software executing on the server from a non-transitory physical medium, the software providing a first function for determining data density ratio in voxel cells neighboring a selected vertex of the voxel cell and or material type of the voxel cell and or the material type of voxel cells neighboring the vertex, a second function for re-computing the position for vertices in the voxel cell based on results of the first function, and a third function for computing new normals based on the new vertex positions.

In one aspect of the method, the physics simulation profiles of the data in each voxel cell are modified according to the onscreen results. In one aspect, the altered visual effect is a smoothing transformation. In another aspect, the altered visual effect is a jagged randomization. In one aspect of the method, for a smoothing transformation, a linear constraint is applied relative to the new computed position of a vertex, the constraint is linearly proportional to the ratio of data density of the neighboring cells.

In one aspect of the method for a randomized transformation, the material type attribute for the host voxel cell and or for each vertex-neighboring cell is considered instead of data density of the neighboring voxel cells. In one aspect, the system further includes a function for establishing a hierarchy of specific algorithms used for treating different material types that may abut one another when rendered onscreen in a virtual environment.

BRIEF DESCRIPTION OF THE DRAWING FIGURES

FIG. 2 is a block diagram depicting a voxel cell that conforms to the regular voxel grid for a flat look.

FIG. 3 is a block diagram of a voxel cell that is altered onscreen to produce a jagged effect according to an embodiment of the present invention.

FIG. 4 is a block diagram of a voxel cell that is altered onscreen to produce a smooth effect according to an embodiment of the present invention.

DETAILED DESCRIPTION

The inventors provide a method for modifying the onscreen geometric profile of three-dimensional data stored on a voxel grid to produce an altered visual effect for the represented data in a way that preserves the efficient processing of data on the grid. The present invention is described in enabling detail using the following examples, which may describe more than one relevant embodiment falling within the scope of the present invention.

Figure 1:
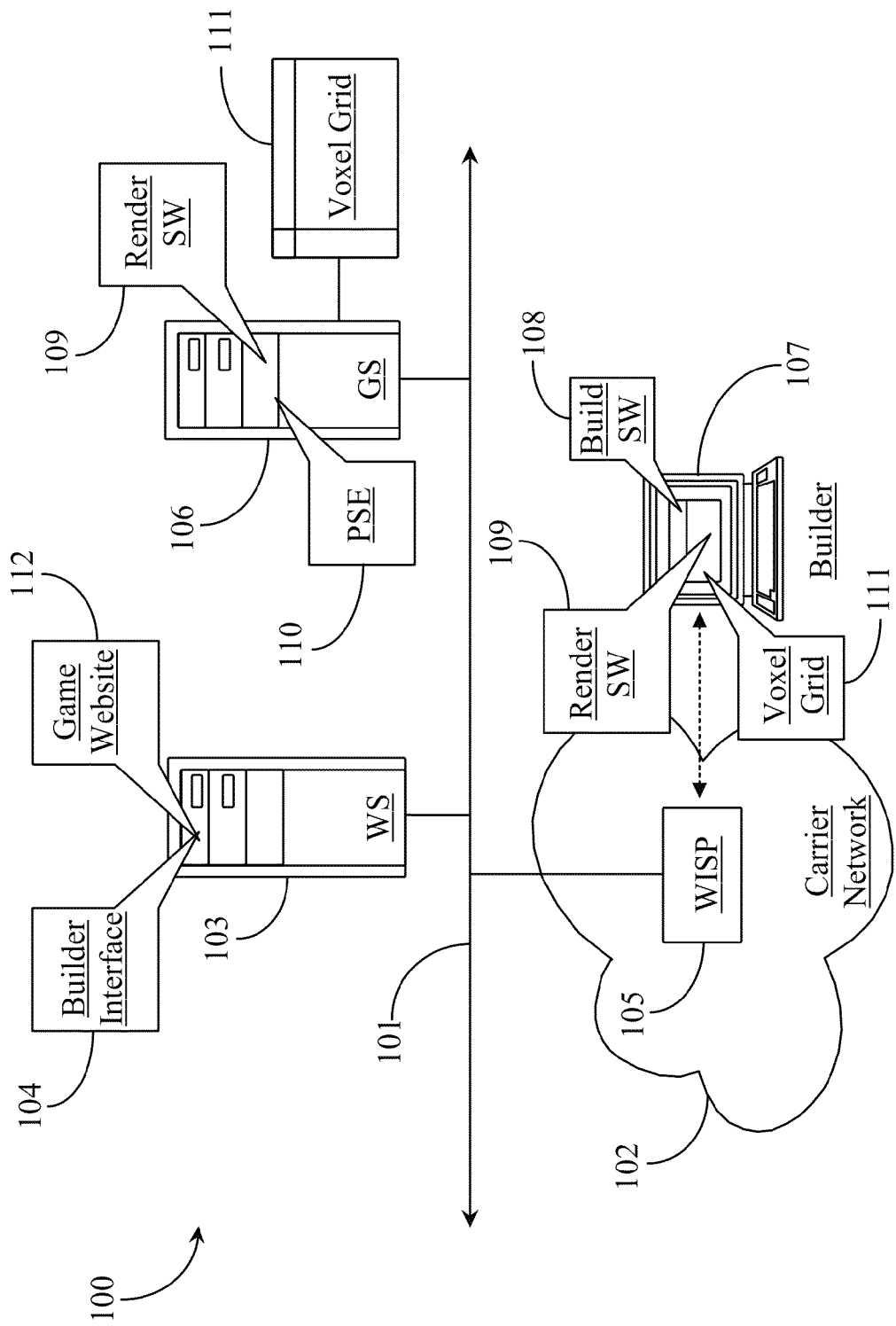
FIG. 1 is an architectural overview of a gaming network that supports onscreen visual modification of voxel data according to embodiments of the present invention.

FIG. 1 is an architectural overview of a gaming network 100 that supports onscreen visual modification of voxel data according to embodiments of the present invention. Gaming network 100 includes the well-known Internet network represented herein by a network backbone 101. Backbone 101 includes all of the lines, equipment, and access points that make up the Internet network as a whole. Therefore, there are no geographic limitations to the practice of the present invention. Gaming network 100 also includes a communications carrier network 102. Carrier network 102 represents and subnetwork connected to Internet 101 that is capable of carrying multi-media communications. Carrier network 102 is a wireless network in this example, however it may also be a wired network without departing from the spirit and scope of the present invention.

Internet backbone 101 supports a web server (WS) 103. WS 103 includes a non-transitory physical medium that contains all of the software and data required to enable function as a Web server. WS 103 may be owned and maintained by a third-party Web-hosting service business without departing from the spirit and scope of the present invention. In one embodiment, WS 103 is owned and maintained by a service provider that provides gaming services to clients connected to the Internet.

WS 103 hosts a gaming website 112. Website 112 may include one or several Webpages dedicated to provision of services relative to Internet gaming, and building of virtual games and environments. Website 112 provides access to a builder interface 104. Builder interface 104 is accessible through connection to WS 112 hosted on web server 103. Interface 104 includes all of the tools for building virtual games and virtual environments in three-dimensional space. In a preferred embodiment three-dimensional data representing the virtual games and environments are stored and rendered from a voxel grid.

Internet backbone 101 supports a gaming server (GS) 106. GS 106 includes a non-transitory physical medium that contains all of the software and data required to enable function as a gaming server. A service provider of Internet gaming may maintain GS 106, or a third party that provides gaming related storage and access services may maintain it. In one embodiment, gaming server 106 is part of a distributed network of multiple gaming servers offered in the vein of cloud computing, a well-known paradigm of distributed network computing. The inventors illustrate just one gaming server 106 and deem the representation sufficient for purposes of explaining the present invention.

GS 106 includes a physical simulation engine (PSE) 110 adapted to simulate physical attributes of gaming and manipulation of virtual environments. PSE 110 represent any physics simulation engine or environment that is responsible for applying physics effects to active state environments triggered by client input during game play and environment construction.

GS 106 also includes object-rendering software (Rendering SW) 109. Rendering SW 109 is responsible for rendering virtual objects and scenery that is typical of a virtual environment upon client request. A copy of the render software 109 is illustrated on a gaming client 107, and resides with each instance of the build software 108 illustrated as residing on gaming client 107. This instance is actively used during build operations. While the gaming server 106 does include a copy of the render software, it is vestigial and not generally used in actual practice, although it may be used in certain instances. One with skill in the art of distributed software will appreciate that the actual software may reside on any machine that is accessible to the operator without departing from the spirit and scope of the present invention.

Gaming client 107 is depicted as having connectivity to carrier network 102. Client 107 is termed a builder in this example because the focus of the instant invention relates to building or constructing virtual games and environments. Builder 107 is represented as a laptop computer in this example, however a number of other gaming clients might be used in place of a laptop. These may include a desktop computer, a smart phone, gaming box, an android device, or any other computing appliance enabled for Internet navigation and interaction with a virtual three-dimensional environment. Builder 107 includes a build software (SW) 108. Build SW 108 is, in a preferred embodiment, part of builder interface 104. Build SW 108 is representative of tools used to build three-dimensional objects and terrain for rendering in virtual space represented by a voxel grid. In this example, voxel grid 111 is connected to and accessible through gaming server 106. A copy of voxel grid 111 also resides on client 107 in this example. Builder interface 104 is presented for access through website 112 in this example. In another embodiment, a builder may access interface 104 and subsequently build SW 108 through gaming server 106 as a result of redirection from the website.

In this example, builder 107 accesses server 103 through a wireless Internet service provider (WISP) 105 connected to Internet backbone 101. Builder 107 uses build SW 108 to create virtual objects and terrain that is stored on voxel grid 111. In practice, builder 107 accesses WS 103 and Website 112 through carrier network 102 and WISP 105. Builder 107 invokes builder interface 104 to access build SW 108. In one embodiment invoking builder interface 104 causes redirection to GS 106 for facilitating storage and rendering of created objects and terrain.

In one embodiment, a copy of the voxel grid exists both on GS 107 and relative to build SW 108 on the client appliance. The copy of the voxel grid (111) at appliance 107 is used by render SW 108 at each client appliance such as appliance 107. The voxel grid copies are synchronized between the GS and the client. One with skill in the art of distributed SW will appreciate that the voxel grid may be represented on any accessible machine, including on more than one machine without departing from the spirit and scope of the present invention.

Build SW 108 includes all of the tools for creating virtual objects and terrain for games or virtual environments or worlds. Once the builder creates a three-dimensional object or terrain, the three-dimensional data is stored on voxel grid 111 in linear fashion as currently known in the art. When the virtual game or environment is rendered, rendering SW 109 takes the voxel grid data and physically modifies the onscreen representation of the data in a rendering layer above the regular voxel grid representation of the environment in order to blend the environment dynamically for each voxel cell in the representation. SW 109 creates one or more visual effects dynamically using one or more algorithms designed for each type of effect. One type of rendering is general rendering that is not specifically relevant to the invention. The relevant type of rendering discussed in this specification is that the voxel grid is "blended".

In practice, SW 109 creates an offset for each vertex in a voxel cell based on a determination of data density in the immediate voxel cells neighboring the vertex for a smoothing transformation. For a random transformation (Jagged look), SW 109 creates an offset for each vertex in a voxel cell based on a determination of material type of the host cell and, perhaps the cells neighboring the vertex. Both transformation processes effectively reposition the affected cell in a rendering layer overlaid over the regular voxel presentation. In actual practice, the transformation may change the shape of the rendered voxel cell in addition to its position. In one example, the cell may be transformed from a regular cube to an irregular six to twelve-sided three-dimensional object that appears like a massaged or mangled cube.

The SW also dynamically re-computes the surface normals for each relocated vertex to produce the desired shading and illumination according to one of a number of available illumination models used in current virtual environments, or future models being developed or contemplated. In one embodiment as mentioned above, the materials type of a unit of building (building block) is considered along with neighboring voxel cells as a weighting factor that is considered for relocation of vertices of a voxel cell. In current implementation, for the time being, each voxel cell only has one material though collectively the surrounding cells may have mixed material types. However, this should not be construed as a limitation of the present invention.

SW 109 is enabled for preserving a flat square representation of a voxel cell or block, producing a jagged, randomized transformation for a voxel cell or block, and producing a smoothing transformation of a voxel cell or block. In one embodiment, rendering SW 109 may also produce hybrid transformations that include aspects of randomization and smoothing for a same voxel cell or block.

It is noted herein that a voxel unit may be the smallest unit or block on a voxel grid, however objects and terrain may be composed of blocks that include two or more individual voxel cells. It is also noted herein that vertices are stitched together to form triangles in this example. In a preferred embodiment, rendering SW 109 does not rely on the computing resources of PSE 110. In this embodiment, algorithmic processing is provided separately from PSE processing and in a layer above the normal screen representation of the voxel data. That is to say that the actual underlying voxel data is not altered on the voxel grid in any way. The visual rendering process is dynamic and is transparent to the client in a preferred embodiment.

FIG. 2 is a block diagram depicting a voxel cell 200 that conforms to the regular voxel grid for a flat look. It is a three-dimensional space that is a cube analogous to a pixel with volume as represented herein by the three-dimensional axis superimposed over the front face of voxel 200. While the term "voxel" originally defines a pixel with volume, in the art the term is used for pretty much any representation of regular (as in consistent, repeated) spacing and roughly regular volume representation. A vertex 201 represents just one of the 8 vertices defining each side of the cube. The cross product of diagonal vertices produces the normals for each represented surface of the cube as is known in the art.

In this example, no overlay rendering is required because the look of cube 200 is flat and conforms to the regular voxel grid representation of a perfectly square voxel or cube. The surface normals for each surface of the cube are orthogonal to the surface as shown by the directional arrows representing the surface normals for the top and right side of the cube as viewed in this example. This flat look presents a cube with normal shading, flat surfaces and vertices laid out in regular intervals to conform to the typical cube dimensioning. In this example, one side of the cube is visibly shaded while the remaining visible sides are illuminated.

FIG. 3 is a block diagram of a voxel cell 300 that is altered onscreen to produce a jagged effect according to an embodiment of the present invention. Voxel cell 300 is represented in a rendering overlay to produce the visual effect of jagged randomization over the actual voxel cell. In this example, a vertex 301 is relocated within the three dimensional space of the voxel cube. To accomplish this, three vertex offset coordinates are randomly generated reflecting the X, Y, and Z dimensions that will define a new position for the vertex. It is noted herein that the new position of vertex 301 does not overwrite the original position of the vertex on a voxel grid. In one embodiment, vertex 301 may have been relocated out instead of withdrawn into the voxel space. The offset location (inside or outside of the original cell boundary) defining the shifted position of vertex 301 depends on the number generated by a pseudorandom number generator.

In actual practice, the voxel grid is most instances does not store vertex locations. In most cases, the vertex location is automatically derived from the voxel position in the voxel grid as each cell is regularly spaced. The process of the invention is focused on a transformation that takes a vertex naively generated from the voxel cell and turns it into a superior generated vertex for that cell. As described above, a pseudorandom number generator may be used to generate the offsets. It is important that the logical (memory representation) coordinates for vertex 301 are used as the seed input for the pseudorandom number generator so that the randomly perturbed vertices are consistent for a given vertex. That ensures that if recalculation is required given the same sets of data, the same result will be generated. The technique for computing normals by deriving the cross products of diagonal-vertices is used for producing the randomized transformation or "jagged look" specifically to alleviate the issue mentioned that the natural triangle normals are different for different parts of a cube face.

The sides of voxel 300 are no longer flat because of the new vertex position. In this example, the vertex is withdrawn into the space of the cube to elicit a jagged or rocky look to the feature represented by the voxel data. The volume of cube 300 is smaller than the volume of cube 200. In one embodiment, the material type represented by the voxel data in cell 300 is considered as a weighting factor in the determination to move the vertex to a virtual position within the cube space rather than a virtual position external from the cube space. Once the vertex is moved, the normals are recomputed for that vertex and thus are changed in direction due to the surfaces adjacent to the vertex no longer being flat surfaces. In this example, there is less intense shadow for the front face of cube 300 than is depicted for flat cube 200 and an additional face is in light shadow to directional differences in the recomputed normals.

In a preferred embodiment, each of the eight vertices of cube 300 may be tweaked after determining material type of the altered cell and in some instances, the material type of neighboring cells. The resulting effect is good for rocky terrain where the visual effect is randomized and irregular. In this example, the shading and illumination properties are different than that of voxel cell 200. The exact shading and illumination effects are partly dependant on the type of model used and on the offset locations of the vertices of the voxel cells. It is also noted that voxel cells that are empty, or for which a flat look is desired, may retain their original vertex positions in the overlay during rendering.

FIG. 4 is a block diagram of a voxel cell 400 that is altered onscreen to produce a smooth effect according to an embodiment of the present invention. Voxel cell 400 is represented in a rendering overlay to produce the visual effect of a smoothing transformation over the actual voxel cell. In this example, a vertex 401 is relocated externally from the three dimensional space of the voxel cube. After re-computing the normals for vertex 401, it is evident that the shading and illumination properties are different than those of cells 200 and 300. There are existing tools known to the inventor that can automatically produce a smoothing effect. For example, combining normals for adjacent faces is a classic technique for making flat paneled surfaces cast shadows as if they were rounded.

In one embodiment, the process for smoothing through an overlay begins after a currently known technique such as combining the normals of adjacent faces to a vertex is used to make the terrain cast shadows as if it were smoothed. For example, in a virtual scene depicting terrain composed of a variety of materials, a grassy hill may be produced where the shadowing looks smoother than those that would appear for concrete features of the same scene using known standard processing. This normal processing may also reflect a sharp silhouette of the grassy hills against sky. In such an environment, the surface normals surrounding each vertex are fixed to make the terrain look rounded, but positioning of each vertex is still blocky or regular according to the voxel grid memory. SW 109 (FIG. 1) enables a further transformation through overlay by adjusting the positions of the vertices so that they better follow the rounded contour that the shadows imply.

To refine the smoothing transformation the vertices that are required to appear more rounded are relocated in the direction of their rounded surface normals. The amount they should be moved linearly is directly dependent on the density of the neighborhood touching that vertex. For example, if most of the cells surrounding the vertex are empty, then the area is not very dense, and the vertex should be withdrawn into the cube. The result is that the cell is smaller because the average is smaller. Alternatively, if most of the cells surrounding that vertex are full then the area is denser. In that case the vertex is relocated out and along the direction of the normal. The result is that the cell is larger because the average is larger. The amount moved along the normal is linearly proportional to the number of occupied neighbor cells. One occupied neighboring cell may be directed as a minimum number and 7 occupied cells may be the maximum number in the ratio given that 8 cells share that vertex.

In a preferred embodiment, the process is performed for each vertex of each voxel cell. That is to say that a determination of whether a vertex should be relocated is made for each vertex of a cell based on the density of data in the immediate neighborhood of each vertex and, in one aspect, on what material types are involved in the construction units. In a terrain that is composed of different material types, the materials often abut one another. Rules may be created that dictate certain transformations for certain material types. For example, grass and earth are soft materials and therefore should be smoothed while rock is a hard material that should be randomized. Metal or like materials that abut grass or rock might retain the flat look. There are many variants that could be produced and that may require more than one algorithm for processing.

Vertices may be processed in parallel during rendering and related processing requirements in the over layer may be different for each basic type of transformation. In one embodiment a hierarchy of transformation algorithms is observed where the most practical transformation algorithm in terms of processing resource burden is selected first when applicable. In this example, flat transformation is the most practical followed by randomization and then by smoothing being the least practical transformation. The transformations are perpetrated in the on-screen geometry through an overlay. The physical geometry data used by the physics simulation engine may also be altered using the same process. In this way, the original vertex locations in each voxel cell are preserved by the integrity of the unchanged data stored in voxel grid memory and processing requirements for rendering the original voxel data on screen or for simulation remain unchanged.

Figure 5:
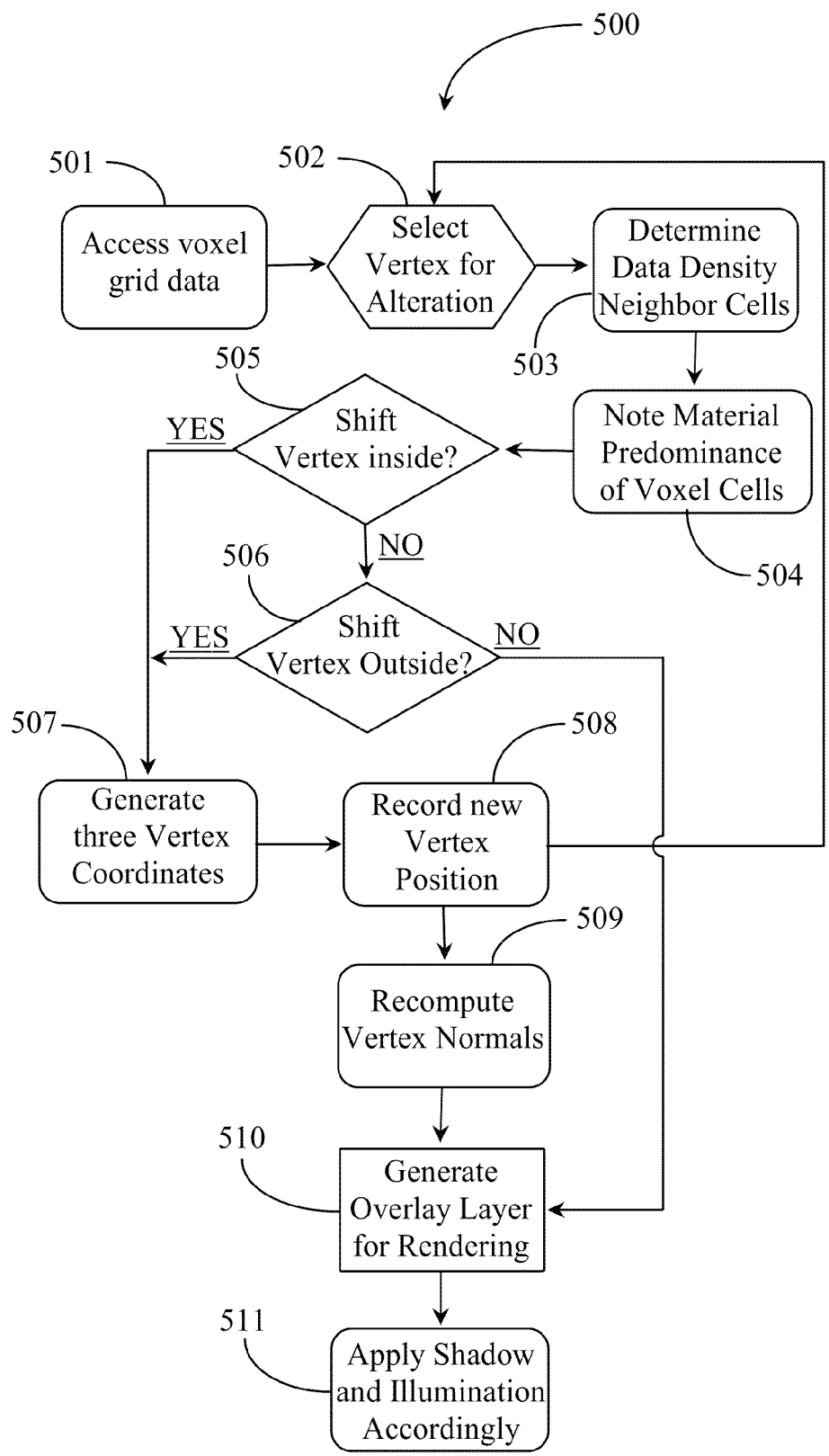
FIG. 5 is a process flow chart depicting steps for producing onscreen visual alterations in voxel data representation according to an embodiment of the present invention.

FIG. 5 is a process flow chart 500 depicting steps for producing onscreen visual alterations in voxel data representation according to an embodiment of the present invention. In step 501, the SW associated with rendering accesses the voxel grid data. This process may be dynamically initiated in a manner that is transparent to the user. At step 502, the process selects a vertex for alteration. It is noted that the process may be performed in parallel for all of the target vertices. At step 503, performed only for a smoothing transformation, the SW looks at the cells surrounding the vertex selected at step 502 and determines the data density of those cells collectively. In one embodiment data density is limited to whether a cell has any data in it or not. For eight cells, a ⅐ ratio may indicate that only one cell of the eight cells is occupied or has data in it. A ⅞ ration may indicate that 7 of the 8 cells are occupied. If the process is for a flat look or a randomized look, data density of neighboring voxel cells is not incorporated into the algorithmic computation.

For the randomized transformation, the process includes step 504 for noting the material predominance of the voxel cell and perhaps, of the neighboring voxel cells that are occupied. Inclusion of this step enables more granular mitigation of the type of transformation for that vertex in mixed terrain where blocks of different material types may abut one another. However, step 504 is not necessarily essential to the practice of the present invention to produce a randomized or jagged transformation. At step 505, the SW determines if the vertex will be shifted inside or within the cell based on the information known in steps 503 and 504. If it is determined at step 505 that the vertex will be moved into the voxel space within the cell, the process skips to step 507 where the SW generates three pseudorandom coordinates representing directions along the X, Y, and Z axis. A pseudorandom generator may generate the values. The amount that each direction is constrained to is linearly proportional to the ratio of data density of the neighboring voxel cells.

If it is determined at step 505 that the vertex should not be moved to a new position within the voxel cell, the SW determines at step 506, if the vertex should be moved to a position outside of the normal voxel cell space. If it is determined at step 506 that the vertex should be moved to a position outside of the regular confines of the cell, the process skips back to step 507. If it is determined that the vertex should not be moved to an external position at step 506, then the process may skip to step 510 where the stock vertex position is computed for a generated overlay for that vertex. In this case, the flat look is determined which requires no operation for shifting the position for that vertex.

Positive determination for step 505 or step 506 triggers pseudorandom number generation at step 507. In either case, the process then moves to step 508 where the new vertex position is recorded. The pseudorandom generator takes the original vertex coordinates as input and, in the case of smoothing, the ratio of data density in neighboring voxel cells. For positive determinations at steps 506 or 507, the vertex normals are recomputed at step 509. No normal computations need be performed for vertex positions that are the same as the original grid positions. At step 510, the SW generates an overlay layer for rendering the transformation over the actual voxel representation (first layer of representation). At step 511, the shadow effects and illumination effects are applied according to the re-computed normals and according to the type illumination model used.

Process 500 represents a process that is performed in parallel for each vertex selected for transformation. It is noted herein that selected vertices may be arbitrarily withdrawn into the voxel space, or pushed out along a rounded normal, or left with the original coordinates. The type of transformation achieved is not dependant on whether the vertices are shifted to voxel space within the cell or externally from the voxel cell. A randomized transformation may include vertices that are shifted to positions within the cell and externally from the cell.

The shifted position of a vertex (location relative to the host voxel cell) depends on the size of the number generated by the pseudorandom generator. The shifted vertex position may lie outside the host voxel cell if, for example, the pseudorandom number generator generates a bigger number. Conversely, for the smoothing transformation, vertices are shifted within the cell space only when the neighboring voxel cells to a surface are less dense. The processing may occur for each vertex in parallel in the overlay layer and rendered dynamically as the positions and new normals are resolved. In one embodiment, the process occurs separately from voxel grid processing where all of the new data is recorded in a separate memory before the overlay layer is generated to render the transformations over the first voxel layer.

In all aspects, the visual effects are temporary and dynamically changeable during routine editing such as altering the terrain, building new features, removing terrain, etc. Such alterations may trigger reprocessing for all of the selected vertices that may be affected by the editing process. In one embodiment, such alterations may also be triggered by normal client alteration of a virtual environment such as by blowing up a tunnel, producing a crater, or adding on to existing terrain. It will be apparent to one with skill in the art that different algorithms may be used in process 500 separately or in combination along with the introduction of new weighting factors, variable, or rules without departing from the spirit and scope of the present invention. The process is intended to be flexible and seamless across the voxel space representing the affected virtual environment.

It will be apparent to one with skill in the art that the visual transformation system of the invention may be provided using some or all of the mentioned features and components without departing from the spirit and scope of the present invention. It will further be apparent to the artisan that in addition to shifting vertices and re-computing normals, the process of transformation may include methods for altering texture coordinates and applying layers of blended textures based on the material density of the voxel cell. In other alterations of the process of the invention, for certain pattern-matched areas of the voxel grid, the system might incorporate a completely separate render pipeline with support for other common rendering techniques such as particle system techniques.

Moreover, the conditions used to determine what transformations should be performed and the parameters considered for the transformation can vary and are not strictly limited those described above. For example, instead of using the voxel cell material type directly to determine the type of transformation, the rendering layer can call the physical simulation engine (PSE) for physical characteristics such as friction and harness factor of that material and the surrounding materials. The system may use returned physical characteristics information about voxel cells to determine what transformations to apply. In one embodiment, a friction factor greater than 5 may call for a jagged transformation. An average hardness factor of neighboring cells that is less than 7 may call for a smoothing transformation. Other factors may also be plugged into those transformations.

It will also be apparent to the skilled artisan that the embodiments described above are specific examples of a single broader invention that may have greater scope than any of the singular descriptions taught. There may be many alterations made in the descriptions without departing from the spirit and scope of the present invention.

What is claimed is:

1. A method for modifying an onscreen rendering based on a voxel grid comprising the steps:
    (a) for each vertex of an individual voxel cell in the voxel grid, determining a ratio as a number of eight cells sharing the vertex that are occupied with data to a number of the eight cells that are unoccupied with data;
    (b) if the ratio is greater than 1, moving the vertex outward relative to the geometry of the individual cell for which the vertex is being considered by an amount linearly proportional to the number of the eight cells sharing the vertex that are occupied with data; and (c) if the ratio is less than 1 moving the vertex inward relative to the geometry of the cell for which the vertex is being considered by an amount linearly proportional to the number of the eight cells sharing the vertex that are unoccupied with data.

2. The method of claim 1, wherein a result of the movement of vertices is a smoothing transformation.

3. The method of claim 1, wherein a result of the movement of vertices is a jagged randomization.

4. The method of claim 1, wherein a result of the movement of vertices is a hybrid between smoothing and randomization.

5. The method of claim 1, wherein in step (c), a constraint is applied relative to the new computed position of a vertex, the constraint linearly proportional to the ratio of data density of the neighboring cells.

6. The method of claim 1, further including a step for readjusting certain vertices to better conform to resulting shadow contours resulting from a normal smoothing operation.

7. The method of claim 1 performed in a layer superimposed above the original data representation in memory relative to the unchanged voxel grid.

8. The method of claim 1, comprising a further step for re-computing normal associated with the new vertex locations.

9. The method of claim 1, wherein in step (c), a pseudo-random number generator is used to generate the offset coordinates.

10. The method of claim 9, wherein logical coordinates of each vertex are used as input to the pseudorandom number generator so randomly perturbed vertices are consistent with offset coordinates.

11. A system for modifying an onscreen rendering of based on a voxel grid comprising:
    an Internet-connected server; and
    software executing on the server from a non-transitory physical medium, the software providing:
    for each vertex of an individual voxel cell in the voxel grid, determining a ratio as a number of eight cells sharing the vertex that are occupied with data to a number of the eight cells that are unoccupied with data;
    if the ratio is greater than 1, moving the vertex outward relative to the geometry of the individual cell for which the vertex is being considered by an amount linearly proportional to the number of the eight cells sharing the vertex that are occupied with data; and
    if the ratio is less than 1 moving the vertex inward relative to the geometry of the cell for which the vertex is being considered by an amount linearly proportional to the number of the eight cells sharing the vertex that are unoccupied with data.

12. The system of claim 11, wherein a result of the movement of vertices is a smoothing transformation.

13. The system of claim 12, wherein a constraint is applied in the smoothing transformation relative to the new computed position of a vertex, the constraint linearly proportional to the ratio of data density of the neighboring cells.

14. The system of claim 11, wherein a result of the movement of vertices is a jagged randomization.

* * * * *